US012782942B2

(12) United States Patent
Wyatt

(10) Patent No.: US 12,782,942 B2
(45) Date of Patent: Nov. 3, 2026

(54) VEHICLE NAVIGATION POSITIONING METHOD AND APPARATUS, AND BASE STATION, SYSTEM AND READABLE STORAGE MEDIUM

(71) Applicant: August Robotics Limited, Shatin (HK)

(72) Inventor: Alexander August Wyatt, Shatin (HK)

(73) Assignee: August Robotics Limited, Shatin (HK)

( * ) Notice: Subject to any disclaimer, the term of this patent is extended or adjusted under 35 U.S.C. 154(b) by 434 days.

(21) Appl. No.: 18/000,662

(22) PCT Filed: Jun. 5, 2020

(86) PCT No.: PCT/CN2020/094629
§ 371 (c)(1),
(2) Date: Dec. 2, 2022

(87) PCT Pub. No.: WO2021/243696
PCT Pub. Date: Dec. 9, 2021

(65) Prior Publication Data
US 2023/0213946 A1 Jul. 6, 2023

(51) Int. Cl.
*G05D 1/00* (2024.01)
*G01C 21/00* (2006.01)

(52) U.S. Cl.
CPC ......... *G05D 1/0274* (2013.01); *G01C 21/005* (2013.01); *G05D 1/0022* (2013.01); *G05D 1/0234* (2013.01); *G05D 1/0246* (2013.01)

(58) Field of Classification Search
CPC .. G05D 1/0274; G05D 1/0022; G05D 1/0234; G05D 1/0246; G01C 21/005
See application file for complete search history.

(56) References Cited

U.S. PATENT DOCUMENTS 9,043,072 B1 * 5/2015 Tisdale .................. G05D 1/027 701/28

FOREIGN PATENT DOCUMENTS

CN 102121827 * 11/2010 ............ G05D 1/027
CN 105486311 A 4/2016
(Continued)

OTHER PUBLICATIONS

CN 109471124 English translation (Year: 2019).*
(Continued)

*Primary Examiner* — Christopher A Buksa
(74) *Attorney, Agent, or Firm* — KPPB LLP

(57) ABSTRACT

Autonomous robotic systems are described. In many embodiments, precision movement is achieved using one or more base stations configured to correct errors that accrue in autonomous vehicles nearby. In many embodiments, a fleet of autonomous vehicles are in communication with one or more base stations. In some embodiments, autonomous vehicles have rotating optical beacons which can be identified by base stations. In turn, base stations in various embodiments have rotating cameras and distance measuring modules, where the camera is used to locate the optical beacons. The distance measuring module can be used to measure a precise distance to the optical beacon, and the rotation angles of both the optical beacon and base station modules can be used to precisely localize the autonomous vehicle relative to the base station. In many embodiments, the positions of autonomous vehicles and/or base stations are stored in a virtual map.

17 Claims, 5 Drawing Sheets

(56) References Cited

FOREIGN PATENT DOCUMENTS

| | | | | |
|---|---|---|---|---|
| CN | 109471124 | A | * | 3/2019 |
| CN | 109870156 | A | | 6/2019 |
| CN | 109900266 | A | | 6/2019 |
| CN | 109959375 | A | | 7/2019 |
| EP | 4148385 | A1 | | 3/2023 |
| JP | 2014215086 | A | | 11/2014 |
| WO | 2021243696 | A1 | | 12/2021 |

OTHER PUBLICATIONS

Extended European Search Report for European Application No. 20938726.5, Search completed May 21, 2024, Mailed May 31, 2024, 15 Pgs.
International Preliminary Report on Patentability for International Application No. PCT/CN2020/094629, Issued Dec. 6, 2022, 7 pgs.
International Search Report and Written Opinion for International Application No. PCT/CN2020/094629, Search completed Feb. 2, 2021, Mailed Feb. 25, 2021, 13 Pgs.
Habib et al., "Interdisciplinary Mechatronics", Engineering Science and Research Development, ISTE Ltd and John Wiley & Sons, Inc., 2013, ISBN: 978-1-84821-418-7, 608 pgs.
International Preliminary Report on Patentability for International Application No. PCT/CN2020/094629, Mailed Dec. 6, 2022, with translation.
Ercan et al., "Automated Localization of a Mobile Construction Robot with an External Measurement Device", 36th International Symposium on Automation and Robotics in Construction (ISARC 2019), 2019, https://doi.org/10.3929/ethz-b-000328442.
Haeberlen et, "Practical Robust Localization over Large-Scale 802.11 Wireless Networks", ACM Intl. Conf. on Mobile Computing and Networking (MOBICOM), Philadelphia, PA, 2004, pp. 70-84.
Kirmse et al., "Global Localization of an Indoor Mobile Robot With a Single Base Station", IFAC Proceedings, vol. 39, No. 16, 2006, pp. 578-583, Retrieved from: https://tud.qucosa.de/en/api/qucosa%3A25904/attachment/ATT-0/.
Kohanbas, David, "Position Tracking: Total Station", robotsforroboticists, Jun. 13, 2014, Retrieved from: https://www.robotsforroboticists.com/total-station/.

* cited by examiner

VEHICLE NAVIGATION POSITIONING METHOD AND APPARATUS, AND BASE STATION, SYSTEM AND READABLE STORAGE MEDIUM

CROSS-REFERENCE TO RELATED APPLICATIONS

The current application is a U.S. national stage of PCT Patent Application Serial No. PCT/CN2020/094629, entitled "Vehicle Navigation Positioning Method and Apparatus, and Base Station, System and Readable Storage Medium" to Alexander August Wyatt, filed Jun. 5, 2020. The disclosure of PCT Patent Application Serial No. PCT/CN2020/094629 is hereby incorporated herein by reference in its entirety.

BACKGROUND

Technical Field

The present invention relates to the technical field vehicle navigation positioning, in particular to a vehicle navigation positioning method, apparatus, base station and system and a readable storage medium.

Related Art

An autonomous driving technology integrates many high technologies such as artificial intelligence, computer vision, integrated navigation, information fusion, automatic control and system architecture and is generated due to high development of computer science and the automation technology; and the autonomous driving technology has become a hot research topic because of its incomparable advantages compared with ordinary vehicles in better vehicle driving performance, driver labor intensity relieving, traffic accident occurrence rate reducing and working capacity in severe conditions and extreme conditions.

Integrated navigation is an important constituent part of the autonomous driving technology, a location of a vehicle needs to be determined first when a server side plans a vehicle advancing route without manned intervention, i.e., positioning. That is, the location and attitude of the vehicle is determined relative to a certain coordinate system. Current vehicle positioning methods generally include inertial navigation, electronic signal positioning and environment characteristic matching.

The inertial navigation technology is a navigation parameter calculating technology with a gyroscope and an accelerometer as sensitive detectors, a current attitude is determined according to an angular speed outputted by the gyroscope, and a speed and displacement of the vehicle under the current attitude are calculated according to an acceleration speed outputted by the accelerometer. Accordingly, a motion track of the vehicle is obtained, and current coordinates are calculated.

The electronic signal positioning technology consists of a receiver and a positioning tag and transmits, via the tag, certain wireless signals such as satellite signals, Bluetooth, Radio Frequency Identification (RFID), Wireless-Fidelity (WIFI) and Ultra Wideband (UWB), and a distance from the tag to the receiver is measured by calculating a time difference from signal being sent to signal being received by the receiver. Since the position of the receiver is known, current location of the vehicle can be roughly calculated.

Environment characteristic matching refers to environment information acquiring and processing by the unmanned vehicle and is mainly used for state perception, and state perception mainly refers to surrounding and vehicle environment information collecting and processing via a vehicle-mounted sensor, including traffic state perception and vehicle body state perception. A traffic state perception function is achieved mainly through environmental perception sensors and corresponding perception technologies. These sensors may be divided, according to paths for acquiring traffic environment information, into two types: 1) passive environment sensors which cannot transmit signals, but acquire environment information by receiving externally-reflected or radiated signals, mainly including vision sensors such as a camera and audio sensors such as a microphone array; and 2) active environment sensors which actively transmit signals to external environment for environmental perception, mainly referring to laser radar, millimeter-wave radar and ultrasonic radar. A vehicle body state perception function is achieved mainly based on a Global Position System (GPS), a BeiDou Navigation Satellite System (BDS), an Inertial Navigation System (INS), and the like, and aims to acquire a driving speed, attitude orientations and other information of the vehicle, and provides effective data for unmanned vehicle positioning and navigating.

As for the current vehicle positioning methods, electronic signal positioning is not high in precision. Current electronic signal positioning products generally have a positioning error greater than 10 cm (0.1 m)), and are easily affected by the environment. In addition, signal attenuation is likely to be caused by distances and obstacles, and system errors, communication delay and other problems will be caused by electromagnetic interference in the complex environment, consequently influencing precision. The widely used inertial navigation positioning method will accumulate a large number of errors in a certain time due to insufficient sensor precision and environment noise influences, consequently, the positioning is inaccurate, and even if a filtering algorithm is adopted, only the noise problem can be solved.

SUMMARY

In view of this, the present invention aims to provide a vehicle navigation positioning method, apparatus, base station and system and a readable storage medium so as to solve the problems that an existing vehicle navigation positioning method is low in positioning precision and is not applicable to application scenarios requiring vehicles to reach accurate positions for operation.

The technical solution adopted by the present invention to solve the above technical problems is as follows:

According to the first aspect of the present invention, provided is a vehicle navigation positioning method applied to a server side, including:

- establishing communication connection with an autonomous driving system of a vehicle and sending driving planned route information to the unmanned vehicle;
- receiving navigation positioning parameters reported by the autonomous driving system and calculating a positioning error value accumulated during unmanned vehicle driving according to the navigation positioning parameters; and sending a navigation correction executing instruction to the unmanned vehicle when the positioning error value reaches a positioning error threshold.

According to the second aspect of the present invention, provided is a vehicle navigation positioning method applied to an unmanned vehicle, including:

receiving driving planned route information issued by a server and reporting navigation positioning parameters to the server;

receiving a navigation correction executing instruction issued by the server when a positioning error value accumulated during unmanned vehicle driving reaches a positioning error threshold; and establishing communication connection with a navigation correcting base station according to the navigation correction executing instruction, acquiring navigation correcting parameters through the navigation correcting base station and reporting the navigation correcting parameters to the server.

According to the third aspect of the present invention, provided is a vehicle navigation positioning method applied to an unmanned vehicle, including:

receiving a navigation positioning service request and generating driving planned route information;

collecting navigation positioning parameters, and calculating according to the navigation positioning parameters to acquire a positioning error value accumulated during unmanned vehicle driving;

inquiring about a closest navigation correcting base station according to the driving planned route information when the positioning error value accumulated during unmanned vehicle driving reaches a positioning error threshold; and establishing communication connection with the navigation correcting base station, acquiring navigation correcting parameters through the navigation correcting base station and modifying the navigation positioning parameters according to the navigation correcting parameters.

According to the fourth aspect of the present invention, provided is a vehicle navigation positioning method applied to a navigation correcting base station, including:

receiving a connection request of an unmanned vehicle, generating navigation correcting parameters of the unmanned vehicle and transmitting the navigation correcting parameters to the unmanned vehicle; or receiving a connection request of an unmanned vehicle, generating navigation correcting parameters of the unmanned vehicle and transmitting the navigation correcting parameters to the unmanned vehicle and a server.

According to the fifth aspect of the present invention, provided is a navigation correcting apparatus installed on an unmanned vehicle, including:

a communication module configured to establish communication connection with a navigation correcting base station;

an optical module configured to reversely search for beacons on the navigation correcting base station and determine an orientation of the navigation correcting base station; and a holder module configured to install the optical module and calculate a course angle of the unmanned vehicle according to a rotation angle of the holder module.

According to the sixth aspect of the present invention, provided is a navigation correcting base station, at least one navigation correcting base station being installed in a driving area of an unmanned vehicle, including:

a communication module configured to establish communication connection with the unmanned vehicle;

an optical ranging module configured to search for a beacon on the unmanned vehicle and measure a distance between the navigation correcting base station and the beacon; and a holder module configured to install the optical ranging module and acquire a rotation angle of the holder module.

According to the seventh aspect of the present invention, provided is a vehicle navigation positioning system, including:

an inertial navigation positioning module integrated in an autonomous driving system and configured to acquire navigation positioning parameters of an unmanned vehicle in real time; and a navigation correcting base station, at least one navigation correcting base station being arranged in a driving area of the unmanned vehicle, configured to measure a real-time location of the unmanned vehicle and acquire navigation correcting parameters; and a navigation correcting apparatus installed on each unmanned vehicle and configured to establish communication connection with the navigation correcting base station and be matched with the navigation correcting base station to acquire the navigation correcting parameters.

According to the eighth aspect of the present invention, further provided is a computer-readable storage medium, having vehicle navigation positioning programs stored thereon, the vehicle navigation positioning programs, when being executed by a processor, implementing the steps of the vehicle navigation positioning method applied to a server side, and/or implementing the steps of the vehicle navigation positioning method applied to an unmanned vehicle, and the steps of the vehicle navigation positioning method applied to a navigation correcting base station.

According to the vehicle navigation positioning method, apparatus, base station and system and the readable storage medium provided by the embodiments of the present invention, the navigation correcting base station is arranged in the driving area of the unmanned vehicle, the unmanned vehicle runs according to a driving planned route of an electronic map in an inertial navigation manner and/or an electronic signal positioning manner, the accumulated error value in the navigation positioning process is calculated, the navigation correcting base station is adopted to eliminate the accumulated error value and correct the navigation positioning parameters, the navigation correcting base station makes the unmanned vehicle acquire an accurate coordinate parameter through a high-precision optical ranging manner, image recognition and other environmental perception sensors or a manner of mechanical socket for positioning, or other manners so that the unmanned vehicle can constantly correct errors in the driving process, and when entering a working area, has a positioning precision level required by operation so as to be applicable to the application scenarios with accurate positioning requirements.

The objective implementation, functional features and advantages of this invention are further illustrated with reference to the accompanying drawings by using the embodiments.

DETAILED DESCRIPTION

To make the technical problems to be solved by the present invention, technical solutions, and advantageous effects clearer and more comprehensible, the following further describes the present invention in detail with reference to the accompanying drawings and embodiments. It should be understood that the specific embodiments described herein are merely used to explain the present invention but are not intended to limit the present invention.

Figure 10:
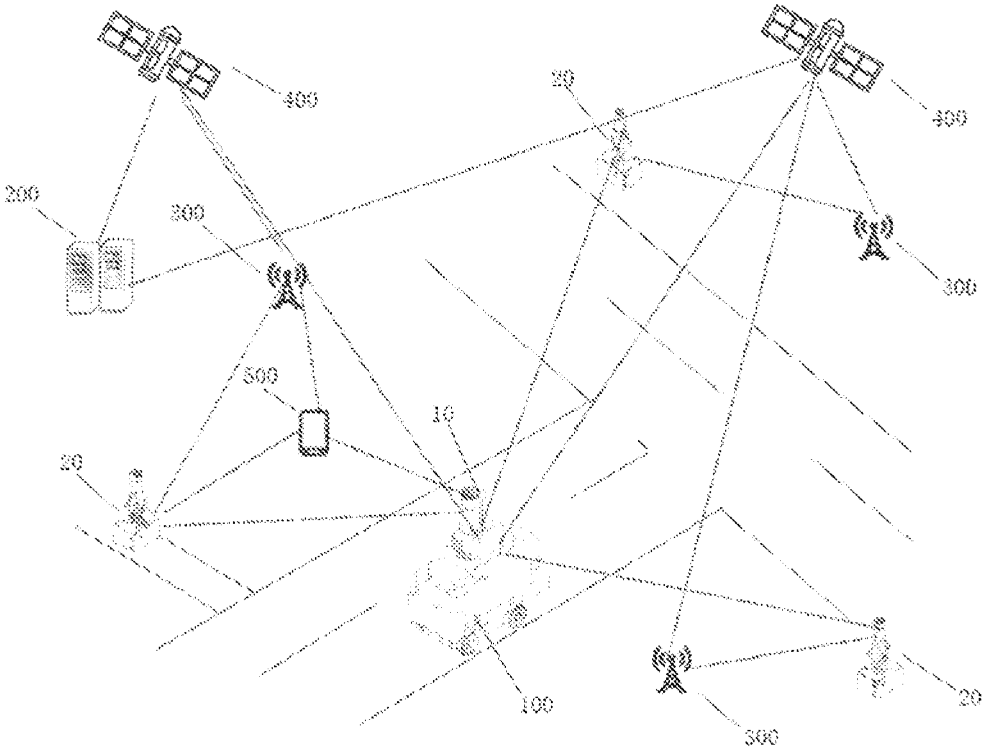
FIG. 10 is a state schematic diagram of a vehicle navigation positioning system according to an embodiment of the present invention.

As shown in FIG. 10, a vehicle navigation positioning system may include an unmanned vehicle 100, a server side 200, a communication base station 300, a communication positioning satellite 400, etc. The unmanned vehicle 100 integrates an autonomous driving system, and the autonomous driving system includes perception, planning and control and is actually of a hierarchical structure, and perception, planning and control interact with one another when working in different layers. Perception refers to a capability of the autonomous driving system to collect information from the environment and extract related knowledge from the information. Environmental perception particularly refers to a capability to understand the environmental scenario, such as obstacle location and road sign/mark detection, pedestrian and vehicle detection and other data semantic classification. Planning is a process that the unmanned vehicle makes some targeted decisions for a certain target. For the unmanned vehicle, the target that generally refers to reach a destination from a point of departure, meanwhile, avoid obstacles, constantly optimize driving tracks and behaviors to ensure safety and comfort of passengers. A planning layer is generally subdivided into three layers including mission planning, behavioral planning and motion planning. Finally, control is a capability of the unmanned vehicle to accurately execute planned actions which are from higher layers. The unmanned vehicle 100 achieves unmanned autonomous driving based on the autonomous driving system, and generally, localization is also a part of perception and is a capability of the unmanned vehicle to determine the location of the unmanned vehicle relative to the environment. We have known that the existing unmanned vehicle positioning methods generally include inertial navigation, electronic signal positioning and environment characteristic matching. Generally, inertial navigation is combined with GPS and other satellite positioning methods, a plurality of sensors are used, and a plurality of manners are fused to achieve reliable navigation and positioning of the unmanned vehicle. Thus, a communication network is formed among the unmanned vehicle 100, the communication base station 300 and the communication positioning satellite 400. In addition, under some situations, the server 200 is need to perform data management, data processing capability support, background traffic control, and the like on the autonomous driving system. Therefore, the server 200 is further integrated in the communication network to serve as a back-end control platform. An unmanned navigation positioning system is jointly formed by the server 200, the unmanned vehicle 100, the communication base station 300 and the communication positioning satellite 400. In addition, a terminal 500 may be further arranged in the communication network, the terminal 500 communicates and interacts with the server 200 through the communication base station 300, and the terminal 500 may also directly communicate and interact with the autonomous driving system of the unmanned vehicle 100.

Based on the above vehicle navigation positioning system, the following specific implementations are proposed.

Embodiment 1

Figure 1:
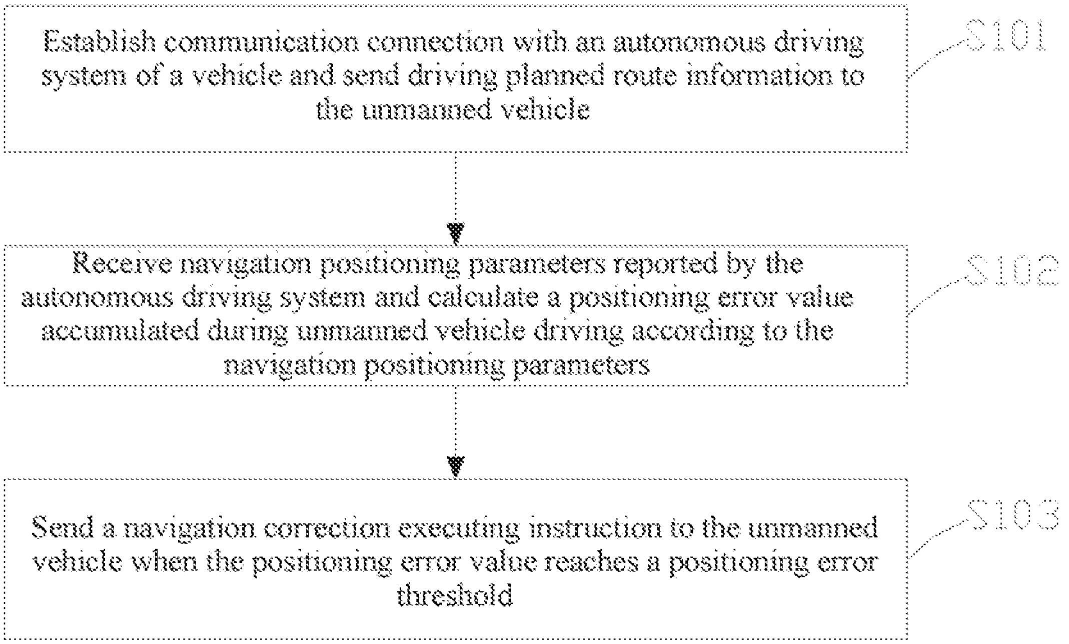
FIG. 1 is a flowchart of a vehicle navigation positioning method applied to a server side according to Embodiment 1 of the present invention.

As shown in FIG. 1, an embodiment of the present invention provides a vehicle navigation positioning method applied to a server side, including:

S101: Establish communication connection with an autonomous driving system of a vehicle and send driving planned route information to the unmanned vehicle.

The unmanned vehicle can only achieve unmanned automatic driving on a preset planned route by integrating the autonomous driving system, and the autonomous driving system includes a plurality of sensors including long-range radar, laser radar, short-range radar, a vehicle-mounted camera, ultrasonic waves, GPS, a gyroscope, etc. Each sensor constantly generates data during running, and the system has a high real-time processing requirement for the data generated by each sensor. For example, the camera needs to reach a frame rate of 60 FPS, which means that each frame is processed only for 16 milliseconds to the maximum. But after a data size is increased, system resource allocation becomes a problem. For example, when a mass of laser radar point cloud data enters the system and fully occupies CPU resources, it is possible that data of the camera cannot be processed in time, consequently, the autonomous driving system misses traffic light recognition, and serious consequence are caused. Thus, reasonably selecting a computing platform for real-time large-scale sensing data processing and performing real-time driving early warning and decision making are of vital importance for safety, reliability and continuity of unmanned driving. The computing platform also needs to give consideration of power consumption, heat dissipation, hardware volume, and the like while providing high-perform data processing support, which is similarly important for continuous safe driving. Thus, various hardware modules have related integrated solutions in an existing unmanned vehicle computing platform. Different computing units are connected through Switch or PCIe Switch for data exchange, thereby finishing collaborative operation. In autonomous driving, computing and decision making need to be performed on sensor data related to intelligent driving. In addition, cooperative control of mechanical components in a traditional vehicle is also needed to finish driving operation executing and transforming. This needs the assistance of a control platform Electronic Control Unit (ECU) and a communication bus. The ECU is a special vehicle microcomputer controller in purpose, uses a set of fixed programs with accurate computing and a mass of experiment data as a basis for constantly comparing and computing data of the mechanical part sensors, and then gives instructions to finish mechanical control. The communication bus such as a controller area network (CAN), a universal serial bus (USB) 3.0 and a local interconnect network (LIN) achieves vehicle data sharing and effective instruction transmitting in this process.

The autonomous driving system has powerful sensor perception capability and corresponding data processing capability; and generally, the computing platform integrated in the autonomous driving system can perform driving planning according to a user driving plan and generate driving planned route information. To reduce redundancy and hardware costs of the autonomous driving system, the server may be connected with the autonomous driving system, and then receives an unmanned vehicle navigation positioning service request reported by the autonomous driving system; the unmanned vehicle navigation positioning service request reported by the terminal and other devices is acquired; and driving planning is performed on the server side, and then the driving planned route information is generated and issued to the autonomous driving system.

S102: Receive navigation positioning parameters reported by the autonomous driving system, and calculate a positioning error value accumulated during unmanned vehicle driving according to the navigation positioning parameters.

The autonomous driving system acquires the navigation positioning parameters of the unmanned vehicle in real time through multi-sensor fusion and multi-navigation-manner fusion of inertial navigation, electronic signal positioning, environment characteristic matching, etc.; and since certain positioning errors will be formed due to the navigation manners and noise of the sensors, as time goes on, the errors are constantly accumulated, and as a result, a positioning error value is higher and higher. The unmanned vehicle reports the navigation positioning parameters to the server in real time, and the server performs calculation according to the navigation positioning parameters to acquire the positioning error values in the navigation positioning process.

S103: Send a navigation correction executing instruction to the unmanned vehicle when the positioning error value reaches a positioning error threshold.

We know that with the positioning error value becoming higher and higher, it is inevitable that the driving route of the unmanned vehicle has certain deviation, while in some application scenarios, the unmanned vehicle needs to reach an assigned location for operation, and this demand has an extremely high demand for working area precision, which cannot be achieved due to the high positioning error. In this case, under the situation that a positioning precision requirement is met, a certain positioning error threshold is preset, the server compares the accumulated positioning error value with the positioning error threshold, and when the positioning error threshold is reached, the server sends the navigation correction executing instruction to the unmanned vehicle; and the navigation positioning parameters of the unmanned vehicle are corrected according to a preset navigation correction manner so as to eliminate the positioning error value.

Specifically, a plurality of navigation correcting base stations are arranged in a driving area of the unmanned vehicle and have fixed coordinate information marked in an electronic map corresponding to the driving area, the electronic map is synchronized to the autonomous driving system and the server, and before the step of sending the navigation correction executing instruction to the unmanned vehicle, the server inquiries about the navigation correcting base station closest to the current location of the unmanned vehicle according to the driving planned route information. The navigation correcting base stations can make the unmanned vehicle acquire relative location information with higher precision relative to coordinate information of the navigation correcting base stations in a physical socket manner, visual positioning, optical ranging, and the like. This information serves as navigation correcting parameters, and the autonomous driving system can modify current navigation positioning parameters according to the navigation correcting parameters so as to eliminate the positioning error value.

In addition, the server may also establish communication connection with the navigation correcting base station, receives the navigation correcting parameters, reported by the navigation correcting base station, of the unmanned vehicle, and modifies the navigation positioning parameters according to the navigation correcting parameters. The positioning error value accumulated during unmanned vehicle driving is re-calculated according to the corrected navigation positioning parameters. By fixing the external navigation correcting parameters provided by the navigation correcting base stations as reference, the unmanned vehicle can correct the error generated due to noise accumulation, and achieves the highest millimeter-level positioning precision on the premise of ensuring the lowest precision requirement.

Embodiment 2

Figure 2:
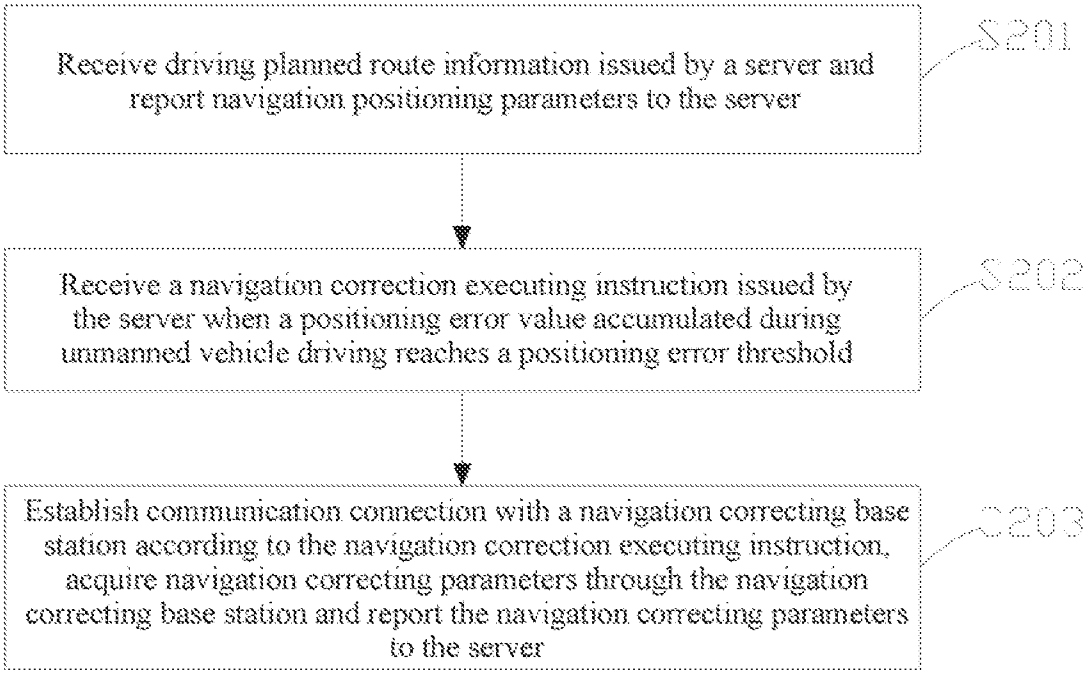
FIG. 2 is a flowchart of a first vehicle navigation positioning method applied to an unmanned vehicle according to Embodiment 2 of the present invention.

As shown in FIG. 2, an embodiment of the present invention provides a vehicle navigation positioning method applied to an unmanned vehicle, including:

S201: Receive driving planned route information issued by a server and report navigation positioning parameters to the server.

To reduce redundancy and hardware costs of an autonomous driving system, a navigation positioning system includes the server, the unmanned vehicle, and a navigation correcting base station, performs driving planning on a server side, generates and issues the driving planned route information and a positioning error value calculated via monitoring to the autonomous driving system. Specifically, the autonomous driving system receives the driving planned route information issued by the server, the unmanned vehicle runs according to the driving planned route information, and a navigation positioning device of the autonomous driving system acquires the navigation positioning parameters in real time and reports the navigation positioning parameters to the server.

S202: Receive a navigation correction executing instruction issued by the server when the positioning error value accumulated during unmanned vehicle driving reaches a positioning error threshold.

The server calculates the positioning error value in the navigation positioning process according to the navigation positioning parameters, and when the positioning error value reaches the positioning error threshold, the server issues the navigation correction executing instruction to the unmanned vehicle.

S203: Establish communication connection with the navigation correcting base station according to the navigation correction executing instruction, acquire navigation correcting parameters through the navigation correcting base station and report the navigation correcting parameters to the server.

The server inquiries about the navigation correcting base station closest to the current location of the unmanned vehicle according to the driving planned route information, coordinate information of the navigation correcting base station is integrated in the navigation correction executing instruction, and the server establishes communication connection with the navigation correcting base station according to the navigation correction executing instruction; or the autonomous driving system searches for communication signals of the navigation correcting base station in manners such as a wireless communication broadcast manner so as to seek communication signal connection with the navigation correcting base station. The navigation correcting base stations can make the unmanned vehicle acquire relative location information with higher precision relative to coordinate information of the navigation correcting base stations in a physical socket manner, visual positioning, optical ranging, and the like. This information serves as navigation correcting parameters, and the autonomous driving system can modify current navigation positioning parameters according to the navigation correcting parameters so as to eliminate the positioning error value.

Embodiment 3

Figure 3:
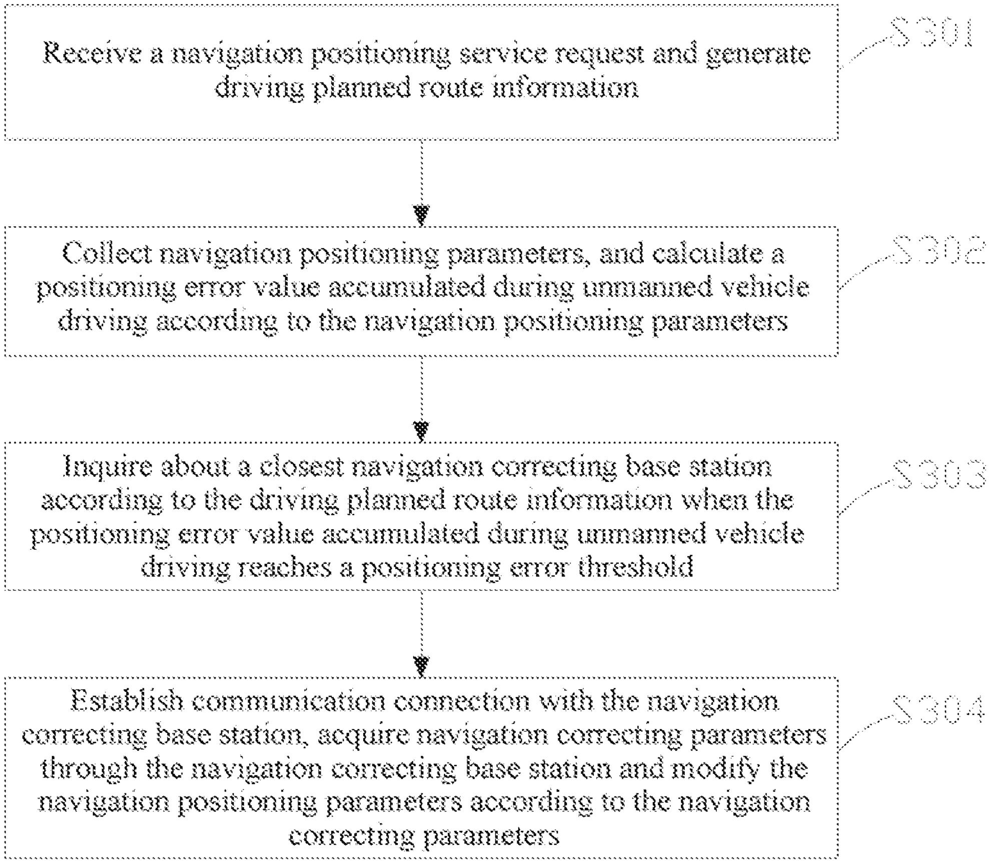
FIG. 3 is a flowchart of a second vehicle navigation positioning method applied to an unmanned vehicle according to Embodiment 2 of the present invention.

As shown in FIG. 3, an embodiment of the present invention provides a vehicle navigation positioning method applied to an unmanned vehicle, including:

S301: Receive a navigation positioning service request and generate driving planned route information.

When an autonomous driving system of the unmanned vehicle has enough system resources and calculating capability, an electronic map with coordinate information of navigation correcting base stations is directly stored in the autonomous driving system, communication connection with the autonomous driving system is established at an input end of the autonomous driving system or through a terminal, the navigation positioning service request, namely a driving destination of a user, is inputted by the input end or a terminal interface to the unmanned vehicle, and the autonomous driving system generates the driving planned information according to the navigation positioning service request.

S302: Collect navigation positioning parameters, and calculate a positioning error value accumulated during unmanned vehicle driving according to the navigation positioning parameters.

The autonomous driving system acquires the navigation positioning parameters of the unmanned vehicle in real time through multi-sensor fusion and multi-navigation-manner fusion of inertial navigation, electronic signal positioning, environment characteristic matching, etc.; and the autonomous driving system calculates the positioning error value in the navigation positioning process according to the navigation positioning parameters.

S303: Inquire about a closest navigation correcting base station according to the driving planned route information when the positioning error value accumulated during unmanned vehicle driving reaches a positioning error threshold.

The autonomous driving system searches for communication signals of the navigation correcting base station according to the electronic map combined with the driving route information or through wireless communication broadcast or other manners so as to seek communication signal connection with the navigation correcting base station.

S304: Establish communication connection with the navigation correcting base station, acquire navigation correcting parameters through the navigation correcting base station and modify the navigation positioning parameters according to the navigation correcting parameters.

The navigation correcting base stations can make the unmanned vehicle acquire relative location information with higher precision relative to coordinate information of the navigation correcting base stations in a physical socket manner, visual positioning, optical ranging, and the like. This information serves as navigation correcting parameters, and the autonomous driving system can modify current navigation positioning parameters according to the navigation correcting parameters so as to eliminate the positioning error value.

Embodiment 4

An embodiment of the present invention further provides a vehicle navigation positioning method applied to a navigation correcting base station, including:

receiving a connection request of an unmanned vehicle, generating navigation correcting parameters of the unmanned vehicle and transmit the navigation correcting parameters to the unmanned vehicle; or receiving a connection request of an unmanned vehicle, generating navigation correcting parameters of the unmanned vehicle and transmitting the navigation correcting parameter to the unmanned vehicle and a server.

There are various types of navigation correcting base stations, for example, fixed positioning sockets distributed in a driving area are adopted, a positioning socket is arranged in the driving area through a stand column, a ground and other manners like an automatic charging manner of an indoor robot mop, a positioning plug connector is correspondingly arranged on the unmanned vehicle, the socket may adopt a conical structure with a large opening so that the positioning plug connector can be smoothly combined with the positioning socket even when the unmanned vehicle has a higher positioning error value, and accordingly, the unmanned vehicle has the accurate navigation positioning parameters in the navigation correcting base station, thereby achieving the purpose of navigation correcting. For another example, a positioning socket, a positioning plug connector and a visual positioning recognition system are combined. Through the visual positioning recognition system, when closing to the navigation correcting base station, real-time navigation positioning parameters of the unmanned vehicle are corrected so that the positioning socket and the positioning plug connector can be combined to achieve the purpose of navigation correcting. For another example, the navigation correcting base station obtains the accurate navigation correcting parameters of the unmanned vehicle relative to the navigation correcting base station in an optical ranging manner and the like, and the navigation positioning parameters of the unmanned vehicle are corrected according to the navigation correcting parameters.

When the vehicle navigation positioning system includes the unmanned vehicle and the navigation positioning base station, the navigation positioning base station establishes communication connection with the autonomous driving system of the unmanned vehicle and corrects the navigation positioning parameters with the autonomous driving system.

When a vehicle navigation positioning system includes the unmanned vehicle, the server and the navigation positioning base station, the navigation positioning base station may establish communication connection with at least one of the autonomous driving system of the unmanned vehicle and the server, and reports the navigation correcting parameters to at least one of the autonomous driving system and the server, and the server or the autonomous driving system modifies the navigation positioning parameters according to the navigation correcting parameters.

Embodiment 5

Figure 4:
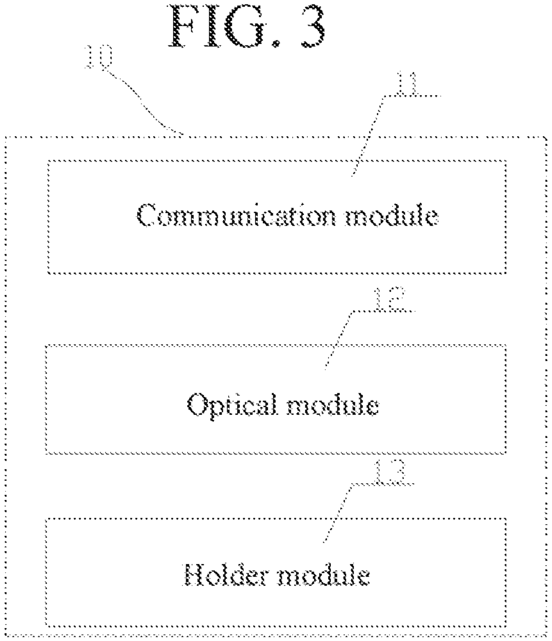
FIG. 4 is a module structure chart of a navigation correcting apparatus according to Embodiment 3 of the present invention.

As shown in FIG. 4, an embodiment of the present invention provides a navigation correcting apparatus 10 installed on an unmanned vehicle, including:

- a communication module 11 configured to establish communication connection with a navigation correcting base station;
- an optical module 12 configured to reversely search for beacons on the navigation correcting base station and determine an orientation of the navigation correcting base station; and
- a holder module 13 configured to install the optical module and calculate a course angle of the unmanned vehicle according to a rotation angle of the holder module.

Figure 7:
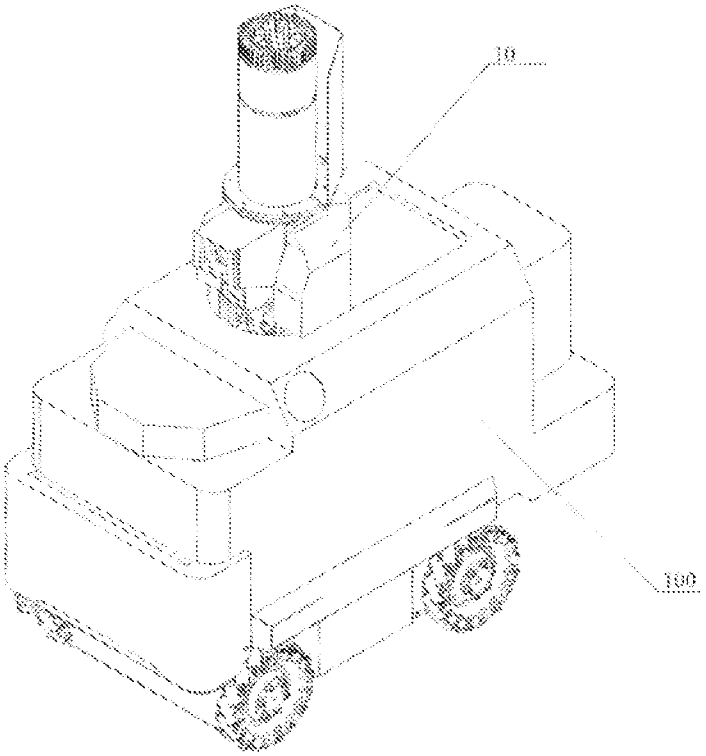
FIG. 7 is a three-dimensional structural view of an unmanned vehicle according to an embodiment of the present invention.
Figure 9:
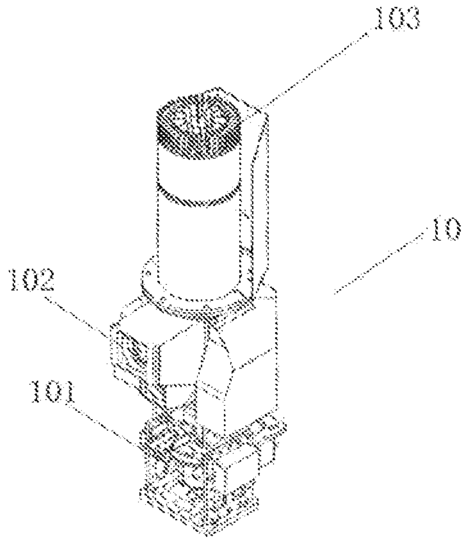
FIG. 9 is a three-dimensional structural view of a navigation correcting apparatus according to an embodiment of the present invention.

Specifically, as shown in FIG. 7 and FIG. 9, the navigation correcting apparatus 10 is installed on the unmanned vehicle 100 and includes a holder installation mechanism 101, an optical camera module 102 and an optical beacon 103 arranged at an upper portion of the apparatus 10. The optical camera module 102 on the navigation correcting apparatus 10 does not include a ranging module, and after the unmanned vehicle establishes communication connection with the navigation correcting base station, a camera on the optical camera module 102 will reversely search for beacons on the navigation correcting base stations for determining the orientation of the navigation correcting base station. An angle returned by the holder installation mechanism 101 can be used for calculating a current course angle of the unmanned vehicle; and the course angle and coordinates returned by the navigation correcting base stations jointly form final coordinates (polar axis coordinates and the course angle) of the unmanned vehicle.

Embodiment 6

Figure 5:
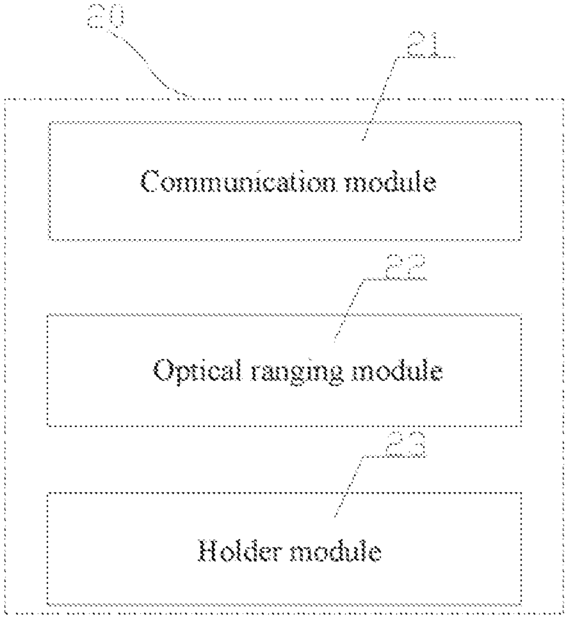
FIG. 5 is a module structure chart of a navigation correcting base station according to Embodiment 4 of the present invention.

As shown in FIG. 5, an embodiment of the present invention provides a navigation correcting base station 20, at least one navigation correcting base station 20 being installed in a driving area of an unmanned vehicle, including:

- a communication module 21 configured to establish communication connection with the unmanned vehicle;
- an optical ranging module 22 configured to search for a beacon on the unmanned vehicle and measure a distance between the navigation correcting base station and the beacon; and
- a holder module 23 configured to install the optical ranging module and acquire a rotation angle of the holder module.

Figure 8:
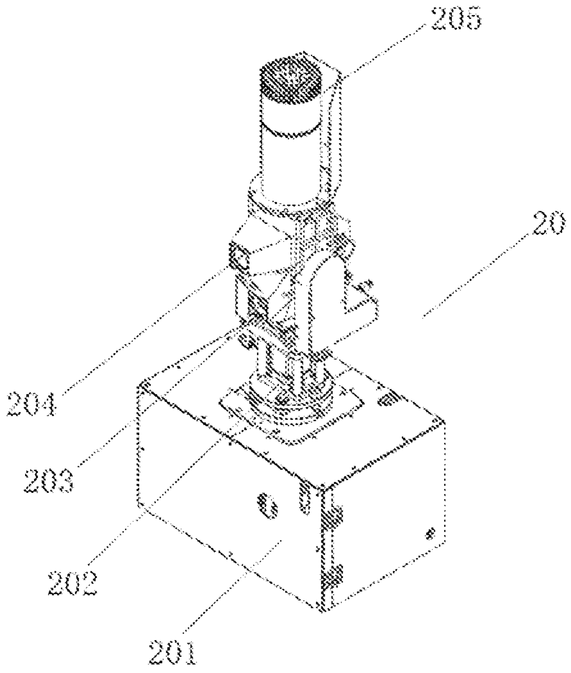
FIG. 8 is a three-dimensional structural view of a navigation correcting base station according to an embodiment of the present invention.

As shown in FIG. 8, the navigation correcting base station 20 includes a base 201 and a base station two-axis holder 202 installed on the base 201, the two-axis holder 202 is provided with the optical ranging module 22 composed of a camera 203 and a measuring module 204, and the camera 203 can automatically track an assigned beacon (a high-brightness light-emitting diode (LED) color block); and a base station beacon 205 is arranged on a top of the base station, and a power device, a control circuit board, and other devices are arranged in the base 201. The communication module 21 is configured to perform one-to-one or one-to-multiple communication with the unmanned vehicle (s), the unmanned vehicle sends positioning coordinates of the unmanned vehicle based on inertial navigation in real time, and during high-precision positioning, the navigation correcting base station 20 returns a ranging positioning result to an autonomous driving system of the unmanned vehicle to correct the coordinates of the unmanned vehicle. The optical ranging module 21 is installed on the two-axis holder, the measuring module 204 is adopted for distance measuring, and the camera 203 searches for a mark on the unmanned vehicle. The camera 203 searches for and locks the vehicle mark based on the vehicle return coordinates, the measuring module 204 measures a distance between the navigation correcting base station 20 and the vehicle, and a holder motor returns a current rotation angle; and accordingly, polar coordinate parameters of the unmanned vehicle relative to the navigation correcting base station are formed, and then, polar axis coordinates of the current unmanned vehicle can be calculated.

Embodiment 7

Figure 6:
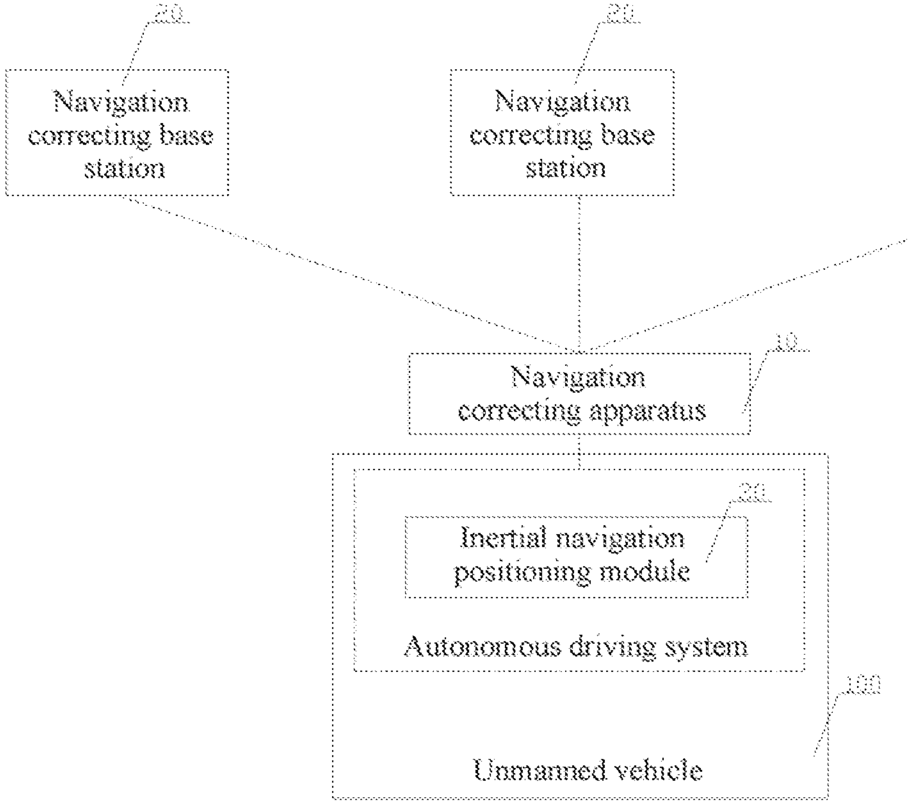
FIG. 6 is a module structure chart of a vehicle navigation positioning system according to Embodiment 5 of the present invention.

As shown in FIG. 6, an embodiment of the present invention provides a vehicle navigation positioning system, including:

- an inertial navigation positioning module 30 integrated in an autonomous driving system and configured to acquire navigation positioning parameters of an unmanned vehicle 100 in real time;
- a navigation correcting base station 20, at least one navigation correcting base station 20 being arranged in a driving area of the unmanned vehicle 100, configured to measure a real-time location of the unmanned vehicle 100 and acquire navigation correcting parameters; and
- a navigation correcting apparatus 10 installed on each unmanned vehicle 100 and configured to establish communication connection with the navigation correcting base station 20 and be matched with the navigation correcting base station 20 to acquire the navigation correcting parameters.

The embodiments of the present invention adopt an inertial navigation manner, a three-dimension polar coordinate location is adopted in inertial navigation, a wheel rotating speed and a three-axis angular speed need to be collected, and a current line speed and a current angular speed of the vehicle are calculated according to a vehicle kinematics model; and positioning can be achieved just according to self-information without acquiring information from the outside. Due to this characteristic, the system deploying difficulty and costs can be greatly reduced; but the defect is that the positioning precision is hard to guarantee along with error accumulation. For such defect, the embodiments of the present invention adopt a coarse positioning and fine positioning combined manner for positioning; and within a certain distance, an inertial navigation scheme is directly adopted as rough positioning, and when errors are accumulated, positioning correcting of the navigation correcting base station is adopted as fine positioning to eliminate the errors, thereby guaranteeing precision.

The embodiments of the present invention adopt monocular optical ranging, a static navigation correcting base station with a ranging function is deployed at an existing location, and an optical ranging module captures a distance and angle relation of the unmanned vehicle and measures accurate coordinates of the unmanned vehicle. Optical ranging precision is far higher than that of an electronic signal ranging technology, and a demand for high precision can be met.

The navigation correcting base station 20 is a fixed base station capable of being rapidly deployed and configured to accurately position the unmanned vehicle 100; and the unmanned vehicle 100 is a mobile device with the inertial navigation positioning module 30 and can achieve rough positioning by calculating device displacement. The rough positioning is performed by the inertial navigation system in the unmanned vehicle to acquire current rough location information in real time, the fixed navigation correcting base station with the known location searches for the unmanned vehicle when high precision is needed to measure a relative location between the unmanned vehicle and the navigation correcting base station, and the coordinates of the unmanned vehicle are corrected according to external feedback, thereby guaranteeing that a positioning error is within a certain degree, and a high-precision positioning requirement in an assigned area is met.

The autonomous driving system of the unmanned vehicle 100 acquires a Computer-Aided Design (CAD) map of a located environment in advance, and generates an XY two-dimensional Cartesian coordinate system based on an electronic map; the navigation correcting base station is arranged at a preset location of the driving area first, an angle is leveled to make the optical ranging module located in a vertical direction to reduce a ranging error caused by inclination, two points with known coordinates are sought nearby the navigation correcting base station 20 for placement of two optical beacons correspondingly, and the coordinates of the navigation correcting base station 20 are determined by a triangular positioning method to deploy the navigation correcting base station 20.

After the unmanned vehicle 100 starts, the navigation correcting base station 20 performs ranging and positioning to accurately acquire a current location of the unmanned vehicle 100; and the unmanned vehicle 100 applies the inertial navigation positioning module 30 to record navigation positioning parameters including a three-axis acceleration speed, a three-axis angular speed and a current attitude angle in real time, and running paths are calculated according to the parameters to obtain real-time rough positioning of the unmanned vehicle 100. After advancing by a long distance, the unmanned vehicle 100 need to stop advancing and is subjected to fine positioning by the navigation correcting base station 20 again to correct the current coordinates. After reaching a high-precision target point, the unmanned vehicle 100 is subjected to fine positioning, and if the distance from the target is less than a certain threshold after correcting, the inertial navigation positioning module 30 finishes a final section of distance; and if the distance is greater than the threshold, the above correcting process is repeated. It can be understood as that when a running distance of the unmanned vehicle 100 is less than this threshold, an error generated by inertial navigation can be ignored.

As shown in FIG. 10, a plurality of navigation positioning base stations 20 are deployed in the driving area, and the unmanned vehicle 100 runs in the driving area. The unmanned vehicle 100 is provided with the navigation correcting apparatus 10, and the unmanned vehicle 100 is controlled by the autonomous driving system to perform real-time navigation running in the driving area through the inertial navigation manner or combination of a plurality of sensors and a plurality of navigation manners, and a user can implement communication connection with the autonomous driving system, a server 200 and the like through a terminal 500, and the terminal 500 can be implemented in various forms. For example, the terminal 500 described in the present invention may include a terminal such as a set top box, a mobile terminal, a smart phone, a notebook computer, a digital audio broadcasting receiver, a Personal Digital Assistant (PDA), a Portable Android Device (PAD), a Personal Multimedia Player (PMP) and a navigation apparatus and a fixed terminal such as a digital TV and a desk computer. However, those skill in the art will understand that besides elements particularly for a moving purpose, the construction according to implementation of the present invention can also be applied to fixed-type terminals.

Embodiment 8

An embodiment of the present invention further provides a computer-readable storage medium, having vehicle navigation positioning programs stored thereon, the vehicle navigation positioning programs, when being executed by a processor, implementing the steps of the vehicle navigation positioning method applied to a server side, and/or implementing the steps of the vehicle navigation positioning method applied to an unmanned vehicle, and the steps of the vehicle navigation positioning method applied to a navigation correcting base station.

INDUSTRIAL APPLICABILITY

According to the vehicle navigation positioning method, apparatus, base station and system and the readable storage medium provided by the embodiments of the present invention, the navigation correcting base station is arranged in the driving area of the unmanned vehicle, the unmanned vehicle runs according to the driving planned route of the electronic map in the inertial navigation manner and/or the electronic signal positioning manner, the accumulated error value in the navigation positioning process is calculated, the navigation correcting base station is adopted to eliminate the accumulated error value and correct the navigation positioning parameters, the navigation correcting base station makes the unmanned vehicle acquire an accurate coordinate parameter through a high-precision optical ranging manner, image recognition and other environmental perception sensors or a manner of mechanical socket for positioning, or other manners so that the unmanned vehicle can constantly correct errors in the driving process, and when entering a working area, has a positioning precision level required by operation so as to be applicable to application scenarios with accurate positioning requirements.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of the present invention essentially, or the part that makes contributions to the prior art may be embodied in the form of a software product. The computer software product is stored in a computer-readable storage medium (such as, a ROM/RAM, a magnetic disk, and an optical disc), and includes several instructions to enable a terminal device (which may be a mobile phone, a computer, a server, an air conditioner or a network device) to perform the vehicle navigation positioning method according to the embodiments of the present invention.

The foregoing describes preferred embodiments of the present invention with reference to the accompanying drawings, and does not limit the scope of the present invention. Any modification, equivalent replacement, and improvement made by a person skilled in the art without departing from the scope and essence of the present invention shall fall within the scope of the claims of the present invention.

What is claimed is:

1. An error-correcting navigation system for autonomous robots, comprising:
- an autonomous robot, comprising:
  - a first camera module housed in a first rotating holder;
  - a first optical beacon;
  - a first transceiver;
  - a plurality of sensors capable of acquiring motion data; and
  - a first processor configured to:
    - navigate the autonomous robot towards a target location;
    - estimate a location of the autonomous robot in a virtual map based on the motion data;
    - orient the first rotating holder such that the camera module is pointed at a base station by tracking a second optical beacon on top of the base station using the camera module;
    - transmit, using the first transceiver, a request for an updated location of the autonomous robot to the base station when the autonomous robot is at the target location according to the estimated location on the virtual map; and
  - the base station, comprising:
    - the second optical beacon;
    - a second camera module housed in a second rotating holder;
    - a measurement module housed in the second rotating holder capable of accurately measuring the distance to a target;
    - a second transceiver; and
    - a second processor configured to:
      - receive the request for the updated location from the autonomous robot using the second transceiver;
      - receive the estimated location of the autonomous robot using the second transceiver;
      - orient the second rotating holder such that the second camera module and the measurement module are pointed at the first optical beacon by tracking the first optical beacon using the second camera module;
      - measure a current distance between the base station and the autonomous robot using the measurement module and the first optical beacon;
      - calculate the updated location of the autonomous robot in the virtual map using the current distance and a rotation angle of the second rotating holder; and
      - transmit the updated location of the autonomous robot to the autonomous robot using the second transceiver;
- wherein the first processor is further configured to:
  - receive the updated location from the base station using the first transceiver;
  - update the estimated location based on the updated location and a rotation angle of the first rotating holder; and
  - adjust the position of the autonomous robot to the target location using the updated location if the difference between the estimated location and the updated location is above a position error threshold.

2. The error-correcting navigation system for autonomous robots of claim 1, wherein the plurality of sensors comprises an inertial positioning system.

3. The error-correcting navigation system for autonomous robots of claim 1, wherein the first processor is further configured to request the updated location when a positioning error threshold is exceeded.

4. The error-correcting navigation system for autonomous robots of claim 1, wherein the first processor is further configured to request a second updated location from the base station after adjustment in order to confirm that the autonomous robot is at the target location.

5. The error-correcting navigation system for autonomous robots of claim 1, further comprising a second base station, where the autonomous robot is configured to request an updated location from the second base station when the second base station is closer than the base station.

6. The error-correcting navigation system for autonomous robots of claim 1, wherein the first processor is further configured to update the plurality of sensors to reduce measurement error using the estimated location and the updated location.

7. The error-correcting navigation system for autonomous robots of claim 1, wherein the autonomous robot is a wheeled robot.

8. The error-correcting navigation system for autonomous robots of claim 1, wherein the second processor is further configured to:
- locate a third optical beacon and a fourth optical beacon using the second camera module and the second rotating holder, where the third and fourth optical beacons have known coordinates;
- measure a distance from the base station to the third optical beacon and a distance from the base station to the fourth optical beacon using the measurement module; and
- calculate the position of the base station by applying a triangulation method.

9. An error-correcting method for precision navigation of autonomous robots, comprising:
- navigating an autonomous robot towards a target location;
- estimating, at a first processor housed in the autonomous robot, the location of the autonomous robot in a virtual map based on motion data captured by a plurality of sensors of the autonomous robot;
- transmitting, using the first transceiver, a request for an updated location of the autonomous robot to the base station when the autonomous robot is at the target location according to the estimated location on the virtual map;

orienting a camera module of the autonomous robot such that the camera module is pointed at a base station by tracking a second optical beacon on top of the base station using the camera module, where the camera module is oriented using a first rotating holder mounted on the autonomous robot;

transmitting the estimated location to a base station using a first transceiver of the autonomous robot;

receiving, at the base station using the second transceiver, the request for the updated location from the autonomous robot;

receiving the estimated location using a second transceiver of the base station;

orienting a second rotating holder of the base station such that a second camera module and a measurement module housed in the second rotating holder are pointed at a first optical beacon mounted on the autonomous vehicle by tracking the first optical beacon using the second camera module;

measuring a current distance between the base station and the autonomous robot using the measurement module and the first optical beacon;

calculating, using a second processor of the base station, an updated location of the autonomous robot in the virtual map using the current distance and a rotation angle of the second rotating holder; and transmitting the updated location of the autonomous robot to the autonomous robot using the second transceiver;

receiving the updated location from the base station using the first transceiver;

updating, using the first processor, the estimated location based on the updated location and a rotation angle of the first rotating holder; and adjusting the position of the autonomous robot to the target location using the updated location if the difference between the estimated location and the updated location is above a position error threshold.

10. The error-correcting method for precision navigation of autonomous robots of claim 9, wherein the plurality of sensors comprises an inertial positioning system.

11. The error-correcting method for precision navigation of autonomous robots of claim 9 further comprising, requesting, using the first processor and the first transceiver, the updated location from the base station when a positioning error threshold is exceeded.

12. The error-correcting method for precision navigation of autonomous robots of claim 9, further comprising requesting a second updated location from the base station after adjustment in order to confirm that the autonomous robot is at the target location.

13. The error-correcting method for precision navigation of autonomous robots of claim 9, further comprising requesting an updated location from the base station, where the base station is a closest base station to the autonomous robot out of a plurality of base stations.

14. The error-correcting method for precision navigation of autonomous robots of claim 9, further comprising updating the plurality of sensors to reduce measurement error using the estimated location and the updated location.

15. The error-correcting method for precision navigation of autonomous robots of claim 9, wherein the autonomous robot is a wheeled robot.

16. The error-correcting method for precision navigation of autonomous robots of claim 9, further comprising:

locating a third optical beacon and a fourth optical beacon using the second camera module and the second rotating holder, where the third and fourth optical beacons have known coordinates;

measuring a distance from the base station to the third optical beacon and a distance from the base station to the fourth optical beacon using the measurement module; and calculating the position of the base station by applying a triangulation method using the second processor.

17. An error-correcting navigation system for autonomous robots, comprising:

an autonomous robot, comprising:

a first camera module housed in a first rotating holder;

a first optical beacon;

a first transceiver;

a plurality of sensors capable of acquiring motion data; and a first processor configured to:

navigate the autonomous robot to a target location in a virtual map;

estimate the location of the autonomous robot in the virtual map based on the motion data;

orient the first rotating holder such that the camera module is pointed at a base station by tracking a second optical beacon on top of the base station using the camera module; and transmit, using the first transceiver, a request for an updated location to the base station;

the base station, comprising:

the second optical beacon;

a second camera module housed in a second rotating holder;

a measurement module housed in the second rotating holder capable of accurately measuring the distance to a target;

a second transceiver; and a second processor configured to:

receive the request for the updated location from the autonomous robot using the second transceiver;

receive the estimated location of the autonomous robot using the second transceiver;

orient the second rotating holder such that the second camera module and the measurement module are pointed at the first optical beacon by tracking the first optical beacon using the second camera module;

measure a current distance between the base station and the autonomous robot using the measurement module and the first optical beacon;

locate a third optical beacon and a fourth optical beacon using the second camera module and the second rotating holder, where the third and fourth optical beacons have known coordinates;

measure a distance from the base station to the third optical beacon and a distance from the base station to the fourth optical beacon using the measurement module;

calculate the position of the base station by applying a triangulation method;

calculate an updated location of the autonomous robot in the virtual map using the current distance, the position of the base station, and a rotation angle of the second rotating holder; and transmit the updated location of the autonomous robot to the autonomous robot using the second transceiver;

wherein the first processor is further configured to:
- receive the updated location from the base station using the first transceiver;
- update the estimated location based on the updated location and a rotation angle of the first rotating holder;
- update the plurality of sensors to reduce measurement error using the estimated location and the updated location; and
- adjust the position of the robot to the target location if the difference between the updated location and the estimated location exceeds a position error threshold.

* * * * *